US012183244B2

(12) United States Patent
Kim

(10) Patent No.: US 12,183,244 B2
(45) Date of Patent: Dec. 31, 2024

(54) DISPLAY APPARATUS AND CONTROL METHOD THEREOF

(71) Applicant: Samsung Electronics Co., Ltd., Suwon-si (KR)

(72) Inventor: Moonhee Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/196,171

(22) Filed: May 11, 2023

(65) Prior Publication Data

US 2024/0013697 A1 Jan. 11, 2024

Related U.S. Application Data

(63) Continuation of application No. PCT/KR2023/005048, filed on Apr. 14, 2023.

(30) Foreign Application Priority Data

Jul. 5, 2022 (KR) ........................ 10-2022-0082380

(51) Int. Cl.
*G09G 3/20* (2006.01)

(52) U.S. Cl.
CPC ..... *G09G 3/2007* (2013.01); *G09G 2320/046* (2013.01); *G09G 2320/0613* (2013.01); *G09G 2320/0686* (2013.01); *G09G 2360/16* (2013.01)

(58) Field of Classification Search
CPC .......... G09G 3/20; G09G 3/2007; G09G 5/10; G09G 2300/0819; G09G 2310/0232;
(Continued)

(56) References Cited

U.S. PATENT DOCUMENTS 8,982,232 B2 3/2015 Kobayashi
9,691,353 B2 6/2017 Joo et al.
(Continued)

FOREIGN PATENT DOCUMENTS

JP 5787648 9/2015
KR 10-0771614 10/2007
(Continued)

OTHER PUBLICATIONS

International Search Report, PCT/ISA/210, dated Jul. 20, 2023, in PCT Application No. PCT/KR2023/005048.
(Continued)

*Primary Examiner* — Nitin Patel
*Assistant Examiner* — Amen W Bogale
(74) *Attorney, Agent, or Firm* — STAAS & HALSEY LLP

(57) ABSTRACT

Disclosed is a display apparatus. The display apparatus includes a display; and at least one processor connected to the display and configured to control the display apparatus, and the processor may, based on a pixel value included in an input image, identify an area in the input image, identify a threshold grayscale value based on histogram information of the identified area, identify an area having a grayscale value equal to or greater than the threshold grayscale in the identified area as a first area and identify a remaining area as a second area, and control the display to reduce luminance of the first area according to a first luminance adjustment scheme and adjust luminance of a second area according to a second luminance adjustment scheme.

20 Claims, 16 Drawing Sheets

(58) Field of Classification Search

CPC ... G09G 2320/0233; G09G 2320/0686; G09G 2320/0257; G09G 2320/0626; G09G 2320/0613; G09G 2320/046; G09G 2320/0271; G09G 2320/103; G09G 2320/04; G09G 2320/062; G09G 2320/043; G09G 2340/12; G09G 2340/16; G09G 2360/16; G06V 2201/09; G06V 10/50

See application file for complete search history.

(56) References Cited

U.S. PATENT DOCUMENTS

| | | | | |
|---|---|---|---|---|
| 10,510,290 | B2 | 12/2019 | Song et al. | |
| 10,748,317 | B2 | 8/2020 | Park | |
| 11,676,543 | B2 | 6/2023 | Jang et al. | |
| 12,008,964 | B2 | 6/2024 | Chun et al. | |
| 2016/0225344 | A1 | 8/2016 | Joo et al. | |
| 2017/0116915 | A1 | 4/2017 | Song et al. | |
| 2020/0074708 | A1* | 3/2020 | Park | G06T 11/60 |
| 2021/0201726 | A1* | 7/2021 | Kim | G09G 3/035 |
| 2021/0398493 | A1 | 12/2021 | Chun et al. | |
| 2022/0028353 | A1* | 1/2022 | Lee | G09G 3/3233 |
| 2022/0076635 | A1 | 3/2022 | Jang et al. | |
| 2023/0274706 | A1 | 8/2023 | Jang et al. | |

FOREIGN PATENT DOCUMENTS

| | | |
|---|---|---|
| KR | 10-2014-0070795 | 6/2014 |
| KR | 10-2015-0049895 | 5/2015 |
| KR | 10-2016-0095673 | 8/2016 |
| KR | 10-2016-0147953 | 12/2016 |
| KR | 10-2020-0027617 | 3/2020 |
| KR | 10-2245365 | 4/2021 |
| KR | 10-2288334 | 8/2021 |
| KR | 10-2021-0157525 | 12/2021 |
| KR | 10-2022-0031848 | 3/2022 |
| KR | 10-2022-0091854 | 7/2022 |

OTHER PUBLICATIONS

Written Opinion, PCT/ISA/237, dated Jul. 20, 2023, in PCT Application No. PCT/KR2023/005048.

* cited by examiner

DISPLAY APPARATUS AND CONTROL METHOD THEREOF

CROSS-REFERENCE TO RELATED APPLICATION(S)

This application is a continuation of PCT/KR2023/005048, filed on Apr. 14, 2023, at the Korean Intellectual Property Receiving Office and claims priority under 35 U.S.C. § 119 to Korean Patent Application No. 10-2022-0082380, filed on Jul. 5, 2022, in the Korean Intellectual Property Office, the disclosures of which are incorporated by reference herein in their entireties.

BACKGROUND

1. Field

The disclosure relates to a display apparatus and a control method thereof and, more particularly to, a display apparatus for adjusting luminance of an input image based on a grayscale value of the input image and a control method thereof.

2. Description of Related Art

An electronic device providing various functions is being developed according to the development of electronic technology. Recently, a display included in a display apparatus is implemented in a form including a plurality of light emitting elements.

However, in the case of a display using a light emitting element, there is a problem in that when the same image such as a logo is continuously displayed for a long time, a stuck afterimage remains, and image quality deterioration is caused. In order to prevent this, the luminance of an area where an afterimage is expected to be generated may be reduced to prevent afterimage generation.

SUMMARY

According to an embodiment, a display apparatus includes a display; and at least one processor configured to, based on a pixel value included in an input image, identify an area in the input image, identify a threshold grayscale value based on histogram information of the identified area, identify an area having a grayscale value equal to or greater than the threshold grayscale in the identified area in the input image as a first area and identify a remaining area in the identified area in the input image as a second area, and control the display to reduce luminance of the first area according to a first luminance adjustment scheme and adjust luminance of a second area according to a second luminance adjustment scheme.

The first luminance adjustment scheme may reduce luminance at a predetermined ratio; and the second luminance adjustment scheme may adjust the luminance at a different ratio according to the grayscale value.

The first luminance adjustment scheme may maintain luminance to a preset luminance, and the second luminance adjustment scheme may output luminance corresponding to a grayscale value.

The processor is further configured to; update the threshold grayscale value by applying a preset weight to the threshold grayscale value, identify, in the identified area in the input image, an area having a grayscale value equal to or greater than the updated threshold grayscale value as the first area and identify a remaining area in the identified area in the input image as the second area, wherein the preset weight is greater than or equal to 1.

The processor is further configured to: identify a logo area in the first area, update the threshold grayscale value based on the threshold grayscale value and a minimum grayscale value in the logo area, and identify an area having a grayscale value greater than or equal to the updated threshold grayscale value in the identified area in the input image as the first area and identify a remaining area in the identified area in the input image as the second area.

The processor is further configured to identify the threshold grayscale value based on at least one of an average value of grayscale values of pixels included in the identified area in the input image, average picture level (APL), and binarization algorithm.

The processor is further configured to: obtain a number of pixels in which a difference of a pixel value between adjacent pixels in the identified area in the input image is less than a preset value as flat information, and adjust the second area based on the flat information.

The processor is further configured to obtain a number of pixels in which a difference of a pixel value between adjacent pixels in the identified area in the input image and a neighboring area of the identified area in the input image is less than the preset value as the flat information.

The processor is further configured to: enlarge the second area based on the flat information being greater than or equal to a threshold value, and reduce the second area based on the flat information being less than the threshold value.

The processor is further configured to identify the area in the input image by comparing corresponding pixel values in at least one frames among a plurality of frames included in the input image.

The processor is further configured to: identify each of the plurality of frames as a plurality of areas, and identify one of the plurality of areas as the area in the input image by comparing pixel values corresponding to each of the plurality of areas in at least some of the plurality of frames.

According to an embodiment, a method includes, based on a pixel value included in an input image, identifying an area in the input image; identifying a threshold grayscale value based on histogram information of the identified area; identifying an area having a grayscale value equal to or greater than the threshold grayscale value in the identified area in the input image as a first area and identify a remaining area in the identified area in the input image as a second area; and reducing luminance of the first area according to a first luminance adjustment scheme and adjusting luminance of a second area according to a second luminance adjustment scheme.

The first luminance adjustment scheme may reduce the luminance at a predetermined ratio; and the second luminance adjustment scheme may adjust luminance at a different ratio according to the grayscale value.

The first luminance adjustment scheme may maintain luminance to a preset luminance; and the second luminance adjustment scheme may output luminance corresponding to a grayscale value.

The method may further include: updating the threshold grayscale value by applying a preset weight to the threshold grayscale value, wherein the identifying as the second area includes identifying, in the identified area in the input image, an area having a grayscale value equal to or greater than the updated threshold grayscale value as the first area and identifying a remaining area in the identified area in the input image as the second area, wherein the preset weight is greater than or equal to 1.

A non-transitory computer readable medium storing a program for executing an operation method of a display apparatus, wherein the operation method may include identifying an area in the input image based on a pixel value included in an input image; identifying a threshold grayscale value based on histogram information of the identified area; identifying an area having a grayscale value equal to or greater than the threshold grayscale value in the identified area in the input image as a first area and identify a remaining area in the identified area in the input image as a second area; and reducing luminance of the first area according to a first luminance adjustment scheme and adjusting luminance of a second area according to a second luminance adjustment scheme.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
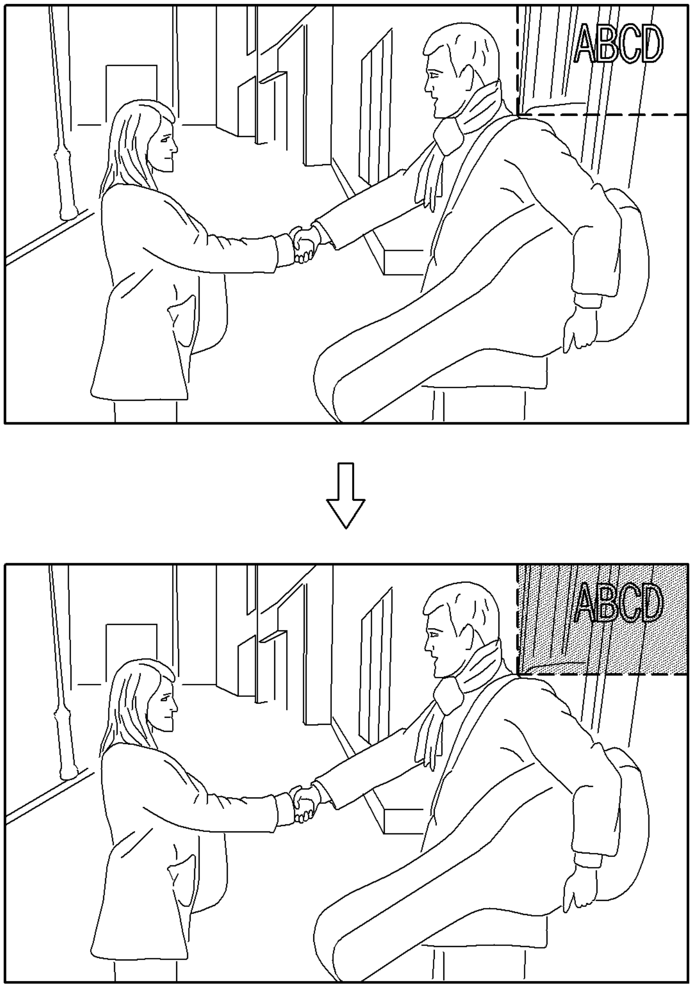
FIGS. 1A and 1B are diagrams illustrating image quality deterioration and a seam visibility problem according to afterimage prevention.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The disclosure provides a display apparatus that prevents a phenomenon that image quality of a display is degraded as stuck afterimage occurs, and a method of controlling the same.

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

As used herein, the term "has," "may have," "includes" or "may include" indicates existence of a corresponding feature (e.g., a numerical value, a function, an operation, or a constituent element such as a component), but does not exclude existence of an additional feature.

The expression "at least one of A or/and B" should be understood to represent "A" or "B" or any one of "A and B." For example, the expression "at least one of A and B" includes any of the following: A, B, A and B. The expression "at least one of A, B, and C" includes any of the following: A, B, C, A and B, A and C, B and C, A and B and C.

As used herein, the terms "first," "second," or the like may denote various components, regardless of order and/or importance, and may be used to distinguish one component from another, and does not limit the components.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, a term user may refer to a person using an electronic apparatus or an apparatus (for example: artificial intelligence (AI) electronic apparatus) that uses an electronic apparatus.

Hereinafter, embodiments of the disclosure will be described in detail with reference to the accompanying drawings.

Figure 1B:
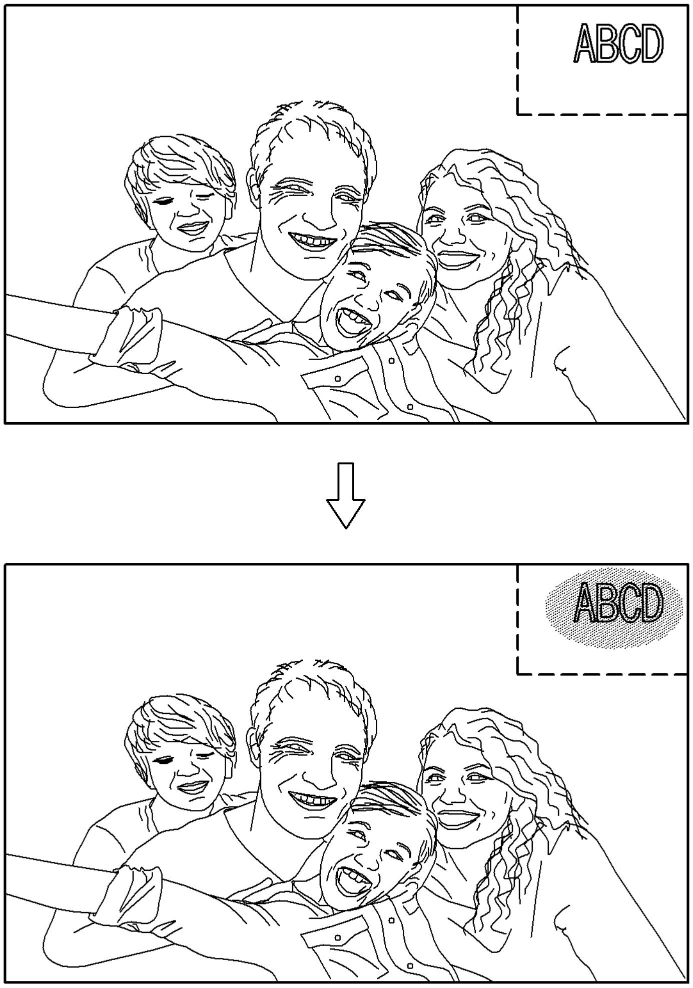

FIGS. 1A and 1B are diagrams illustrating image quality deterioration and a seam visibility problem according to afterimage prevention.

A display apparatus may prevent afterimage by reducing the luminance of an area in which the same image lasts for a long time, but as shown in FIG. 1A, the peripheral area may be darkened together so that image quality degradation may occur.

As the luminance of some areas decreases, as illustrated in FIG. 1B, the boundary of the area of which luminance is reduced may be visible.

The disclosure may prevent image quality degradation due to luminance reduction, minimize a problem in which a boundary of an area having reduced luminance is visible, and prevent afterimage generation.

Figure 2:
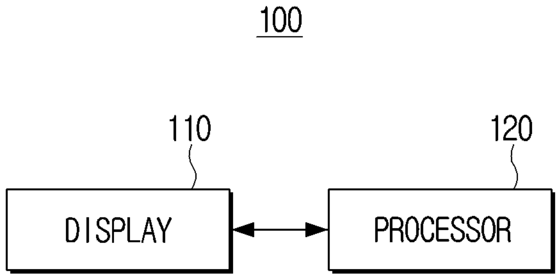
FIG. 2 is a block diagram illustrating a configuration of a display apparatus according to an embodiment of the disclosure.

FIG. 2 is a block diagram illustrating a configuration of a display apparatus 100 according to an embodiment of the disclosure.

The display apparatus 100 is an apparatus displaying an input image and may be any apparatus which may display an input image such as a TV, a desktop PC, a notebook PC, a video wall, a large format display (LFD), a digital signage, a digital information display (DID), a projector display, a digital video disk (DVD) player, a refrigerator, a washing machine, a smartphone, a tablet PC, a monitor, a smart glasses, a smart watch, or the like.

Referring to FIG. 2, the display apparatus 100 includes a display 110 and a processor 120.

The display 110 is configured to display an image and may be implemented as a display of various types such as, for example, a liquid crystal display (LCD), organic light emitting diodes (OLED) display, or plasma display panel (PDP). In the display 110, a backlight unit, a driving circuit which may be implemented as an a-si thin film transistor (TFT), low temperature poly silicon (LTPS) TFT, organic TFT (OTFT), or the like, may be included as well. The display 110 may be implemented as a touch screen coupled to a touch sensor, a flexible display, a third-dimensional (3D) display, or the like.

The processor 120 controls the overall operation of the display apparatus 100. Specifically, the processor 120 may be connected to each component of the display apparatus 100 to control the overall operation of the display apparatus 100. For example, the processor 120 may be connected to a configuration such as the display 110, a memory (not shown), a communication interface (not shown), and the like to control the operation of the display apparatus 100.

The processor 120 according to an embodiment may be implemented with a digital signal processor (DSP), a microprocessor, and a time controller (TCON), or the like, but the processor is not limited thereto. The processor 120 may include, for example, and without limitation, one or more among a central processor (CPU), a micro controller unit (MCU), a microprocessor unit (MPU), a controller, an application processor (AP), a communication processor (CP), an advanced reduced instruction set computing (RISC) machine (ARM) processor, a dedicated processor, or may be defined as a corresponding term. The processor 120 may be implemented in a system on chip (SoC) type or a large scale integration (LSI) type that a processing algorithm is built therein, or in a field programmable gate array (FPGA) type.

The processor 120 may be implemented with a plurality of processors. For convenience of description, an operation of the display apparatus 100 will be described with the expression, the processor 120.

The processor 120 may identify one area in an input image based on a pixel value included in the input image.

For example, the processor 120 may identify one area by comparing pixel values corresponding to at least some frames among a plurality of frames included in an input image. For example, the processor 120 may compare two consecutive frames among a plurality of frames to identify one area including an area having the same pixel value. The processor 120 may identify each of the plurality of frames as a plurality of areas, compare pixel values corresponding to each of the plurality of areas in at least some of the plurality of frames, and identify one of the plurality of areas as one area. Alternatively, the processor 120 may identify one area by inputting a frame into an artificial intelligence model.

However, the embodiment is not limited thereto, and the processor 120 may identify a logo area by various methods or identify a preset area including the logo area as one area.

The processor 120 may identify a threshold grayscale value based on histogram information of the identified area. For example, a threshold grayscale value may be identified based on at least one of an average value of pixels included in a pre-identified area, an average picture level (APL), and a binarization algorithm of grayscale values. Here, the binarization algorithm may be the Otsu algorithm, but is not limited thereto, and various binarization algorithms may be used.

The processor 120 may identify, as a first area, an area having a grayscale value equal to or greater than a threshold grayscale value in the identified area, identify the remaining area as a second area, reduce the luminance of the first area according to the first luminance adjustment method, and control the display 110 to adjust the luminance of the second area according to the second luminance adjustment method.

For example, the processor 120 may reduce the luminance of the first area based on a first luminance adjustment method for reducing the luminance at a preset ratio, and adjust the luminance of the second area based on a second luminance adjustment method for adjusting the luminance at a different ratio according to the grayscale value. Alternatively, the processor 120 may reduce the luminance of the first area based on a first luminance adjustment scheme in which the luminance is maintained at a preset luminance and may output the second area based on a second luminance adjustment scheme that output a luminance corresponding to the grayscale value. That is, the processor 120 may minimize the generation of an afterimage in the first area by reducing the luminance of the first area having relatively high luminance. In addition, the processor 120 adjusts the luminance of the second area around the first area in a manner different from that of the first area or does not adjust the luminance thereby reducing deterioration of image quality due to luminance reduction.

The luminance adjustment method may be implemented with a luminance adjustment graph, a luminance adjustment algorithm, or the like.

The processor 120 may update a threshold grayscale value by applying a preset weight to a threshold grayscale value, identify an area having a grayscale value equal to or greater than a threshold grayscale value updated in the identified area as a first area, and identify the remaining area as a second area. Here, the preset weight may be 1 or higher. Through this operation, the luminance of the second area around the first area may be further preserved to reduce deterioration of image quality. However, it is difficult to determine a preset weight.

The processor 120 may identify the logo area in the first area, update the threshold grayscale value based on the threshold grayscale value and the minimum grayscale value in the logo area, identify, as the first area, an area having a grayscale value equal to or greater than the updated threshold grayscale value in the identified area, and identify the remaining area as the second area. For example, the processor 120 may update a threshold grayscale value with a grayscale value between a threshold grayscale value and a minimum grayscale value. In this case, it is possible to solve a problem that the preset weight is difficult to be determined.

The processor 120 may obtain the number of pixels of which a difference of a pixel value with adjacent pixels in the identified area is less than the preset value as flat information, and may adjust the second area based on the flat information.

For example, the processor 120 may obtain, as flat information, the number of pixels of which a difference between pixel values between adjacent pixels in an identified area and an adjacent area of the identified area is less than a preset value, expand the second area when the flat information is equal to or greater than a threshold value, and reduce the second area when the flat information is less than the threshold value. Through this operation, it is possible to solve a problem in which a luminance reduction boundary is visible.

A function related to artificial intelligence according to the disclosure may operate through the processor 120 and a memory (not shown).

The processor 120 may be composed of one or a plurality of processors. The one or a plurality of processors 120 may be a general-purpose processor such as a central processor (CPU), an application processor (AP), a digital signal processor (DSP), a graphics-only processor such as a graphics processor (GPU), a vision processing unit (VPU), an AI-only processor such as a neural network processor (NPU), or the like.

The one or a plurality of processors may control processing of the input data according to a predefined operating rule or AI model stored in the memory. If the processor is an AI-only processor, the processor may be designed with a hardware structure specialized for the processing of a particular AI model. The predefined operating rule or AI model is made through learning.

Here, being made through learning may refer to a predetermined operating rule or AI model set to perform a desired feature (or purpose) is made by making a basic AI model trained using various training data using learning algorithm. The learning may be accomplished through a separate server and/or system, but is not limited thereto and may be implemented in an electronic apparatus. Examples of learning algorithms include, but are not limited to, supervised learning, unsupervised learning, semi-supervised learning, or reinforcement learning.

The AI model may include a plurality of neural network layers. Each of the plurality of neural network layers includes a plurality of weight values, and may perform a neural network processing operation through an iterative operation leveraging results of a previous layer and a plurality of weight values. The weight values included in the plurality of neural network layers may be optimized by learning results of the AI model. For example, the parameters may be updated such that a loss value or a cost value obtained by the AI model is reduced or minimized during the learning process.

The artificial neural network may include deep neural network (DNN) and may include, for example, but is not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial network (GAN), or deep Q-networks, or the like.

Figure 3:
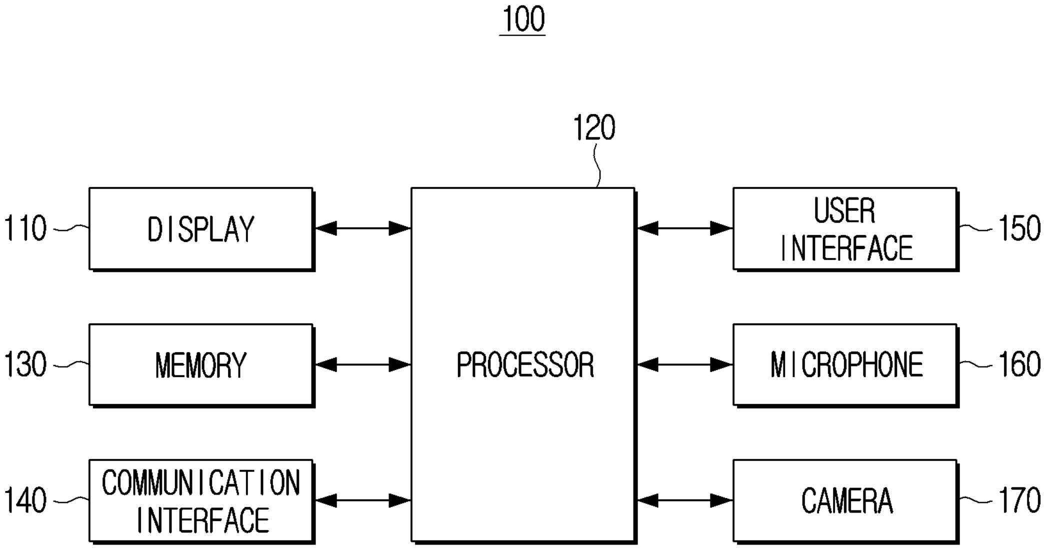
FIG. 3 is a block diagram illustrating a detailed configuration of a display apparatus according to an embodiment of the disclosure.

FIG. 3 is a block diagram illustrating a detailed configuration of the display apparatus 100 according to an embodiment of the disclosure. The display apparatus 100 may include the display 110 and the processor 120. Referring to FIG. 3, the display apparatus 100 may further include a memory 130, a communication interface 140, a user interface 150, a microphone 160, and a camera 170. Among the elements of FIG. 3, the elements overlapping with FIG. 2 will not be further described.

The memory 130 may refer to a hardware that stores information such as data as an electric or magnetic form so that the processor 120, or the like, may access, and the memory 130 may be implemented as at least one hardware among a non-volatile memory, a volatile memory, a flash memory, a hard disk drive (HDD) or solid state drive (SSD), random access memory (RAM), read-only memory (ROM), or the like.

The memory 130 may store at least one instruction, program, or data used for operation of the display apparatus 100 or the processor 120. The instruction is a code unit that directs the operation of the display apparatus 100 or the processor 120, and may be written in a machine language that may be understood by a computer. In the memory 130, a plurality of instructions that perform a particular task of the display apparatus 100 or the processor 120 may be set as an instruction set.

The memory 130 may store data which is information in bit unit or byte unit that may represent characters, numbers, images, or the like. For example, the memory 130 may store image content, or the like.

The memory 130 is accessed by the processor 120, and reading/writing/correction/deletion/update of instructions, instruction set, or data may be performed by the processor 120.

The communication interface 140 is configured to communicate with various types of external devices according to various types of communication methods. For example, the display apparatus 100 may perform communication with a server or a user terminal through the communication interface 140.

The communication interface 140 may include a Wi-Fi module, a Bluetooth module, an infrared communication module, a wireless communication module, or the like. Each communication module may be implemented as at least one hardware chip.

The Wi-Fi module and the Bluetooth module perform wireless communication using Wi-Fi method and Bluetooth protocols, respectively. When using the Wi-Fi module or the Bluetooth module, various connection information such as a service set identifier (SSID) and a session key may be transmitted and received to establish a communication session, and communication information may be transmitted after a communication connection is established. The infrared ray communication module performs communication according to infrared data association (IrDA) technology that transmits data wireless to local area using infrared ray between visible rays and millimeter waves.

The wireless communication module may include at least one communication chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication modes described above.

The communication interface 140 may include wired communication interface such as high-definition multimedia interface (HDMI), display port (DP), Thunderbolt, universal serial bus (USB), RGB, d-subminiature (D-SUB), digital visual interface (DVI), and the like.

The communication interface 140 may also include at least one of a wired communication module to perform communication using a local area network (LAN) module, Ethernet module, and wired communication module performing communication using a pair cable, a coaxial cable, an optical cable, or the like.

The user interface 150 may be implemented with a button, a touch pad, a mouse, a keyboard, or a touch screen capable of performing the display function and operation input function. The button may be various types of buttons such as a mechanical button, a touch pad, a wheel, or the like, formed in an arbitrary area such as at least one of a front portion, a side portion, a back portion, and the like, of the outer surface of the main body of the display apparatus 100.

The microphone 160 is configured to receive sound and convert the sound into an audio signal. The microphone 160 may be electrically connected to the processor 120 and may receive sound under the control of the processor 120.

For example, the microphone 160 may be integrally formed as an integral unit on an upper side, a front side direction, a side direction, or the like of the display apparatus 100. Alternatively, the microphone 160 may be provided in a remote controller or the like separate from the display device 100, and in this case, the remote controller may receive sound through the microphone 160 and provide the received sound to the display apparatus 100.

The microphone 160 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The microphone 160 may be implemented with a format of a sound sensor and may be any type that can collect sound.

The display apparatus 100 may further include the camera 170. The camera 170 is configured to capture a still image or a moving image. The camera 170 may capture a still image at a specific point in time, but may also continuously capture the still image.

The camera 170 may capture the front of the display apparatus 100 to capture a user watching the display apparatus 100. The processor 120 may change a luminance reduction degree based on whether a user is identified from an image captured through the camera 170. For example, the processor 120 may significantly reduce luminance when a user is not identified than when a user is identified from an image captured through the camera 170.

The camera 170 includes a lens, a shutter, an aperture, a solid-state imaging device, an analog front end (AFE), and a timing generator (TG). The shutter adjusts the time at which the light reflected by the subject enters the camera 170, and the aperture adjusts the amount of light incident on the lens by mechanically increasing or decreasing the size of an opening through which the light enters. The solid-state imaging device outputs an image by a photoelectric charge as an electric signal when the light reflected on the subject is accumulated as the photoelectric charge. TG outputs a timing signal for reading out pixel data of the solid-state imaging device, and AFE samples and digitizes the electrical signal output from the solid-state imaging device.

As described above, the display apparatus 100 may suppress the generation of afterimage while reducing the deterioration of image quality by adjusting the luminance of an area having a high possibility of afterimage occurrence in a different luminance adjustment method and the luminance of the remaining area. In addition, the display apparatus 100 may solve a problem in which a luminance reduction boundary is viewed by determining a range of an area for adjusting luminance based on a pixel value difference between adjacent pixels.

Hereinbelow, an operation of the display apparatus 100 will be described in greater detail through FIGS. 4 to 14. FIGS. 4 to 14 describe individual embodiments for convenient description. The individual embodiments of FIGS. 4 to 14 may be implemented in any type of combination.

Figure 4:
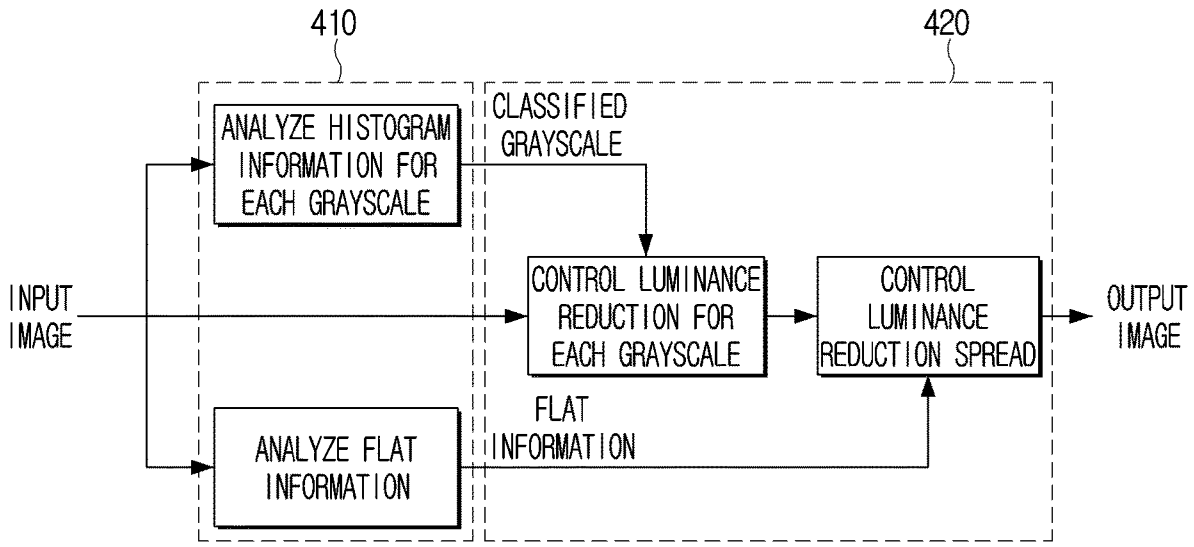
FIG. 4 is a diagram for generally describing an operation of a processor 120 according to an embodiment of the disclosure.

FIG. 4 is a diagram for generally describing an operation of the processor 120 according to an embodiment of the disclosure.

The processor 120 may analyze the input image (410) and adjust luminance of the input image (420) as illustrated in FIG. 4.

First, the processor 120 may analyze histogram information for each grayscale of one area of an input image and control the luminance for each grayscale to be reduced based on a classification grayscale obtained as a result of the analysis. For example, the processor 120 may identify a threshold grayscale value based on histogram information of one area, identify, as a first area, an area having a grayscale value equal to or greater than a threshold grayscale value in one area, identify the remaining area as a second area, reduce the luminance of the first area according to a first luminance adjustment method, and adjust the luminance of the second area according to a second luminance adjustment method.

The processor 120 may analyze flat information of one area of the input image and control the luminance reduction spread based on the flat information. For example, the processor 120 may acquire, as flat information, the number of pixels in which a difference between pixel values between adjacent pixels in one area is less than a preset value, and expand or reduce a second area based on the flat information. That is, the processor 120 may change the size of the second area for adjusting the luminance according to the second luminance adjustment method.

Figure 5:
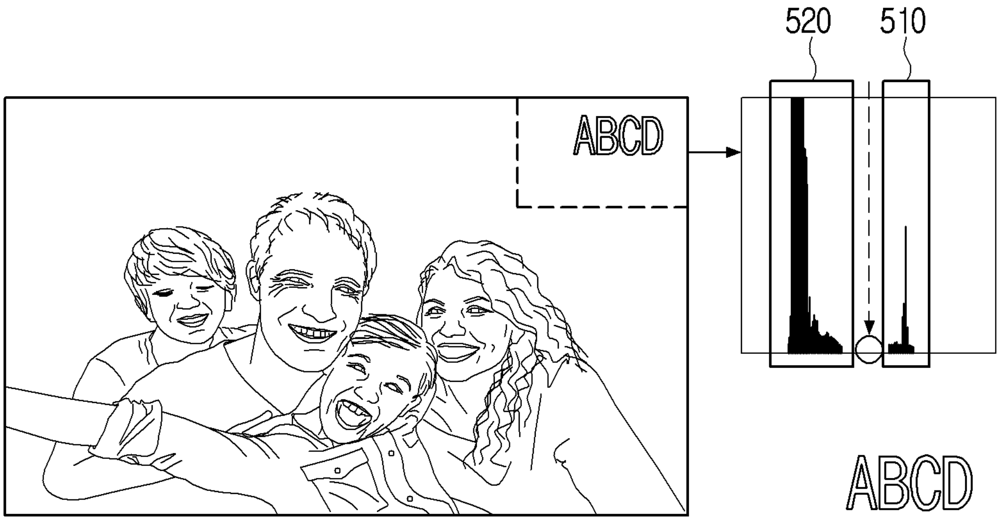
FIGS. 5 and 6 are diagrams illustrating a threshold grayscale value according to an embodiment of the disclosure.
Figure 6:
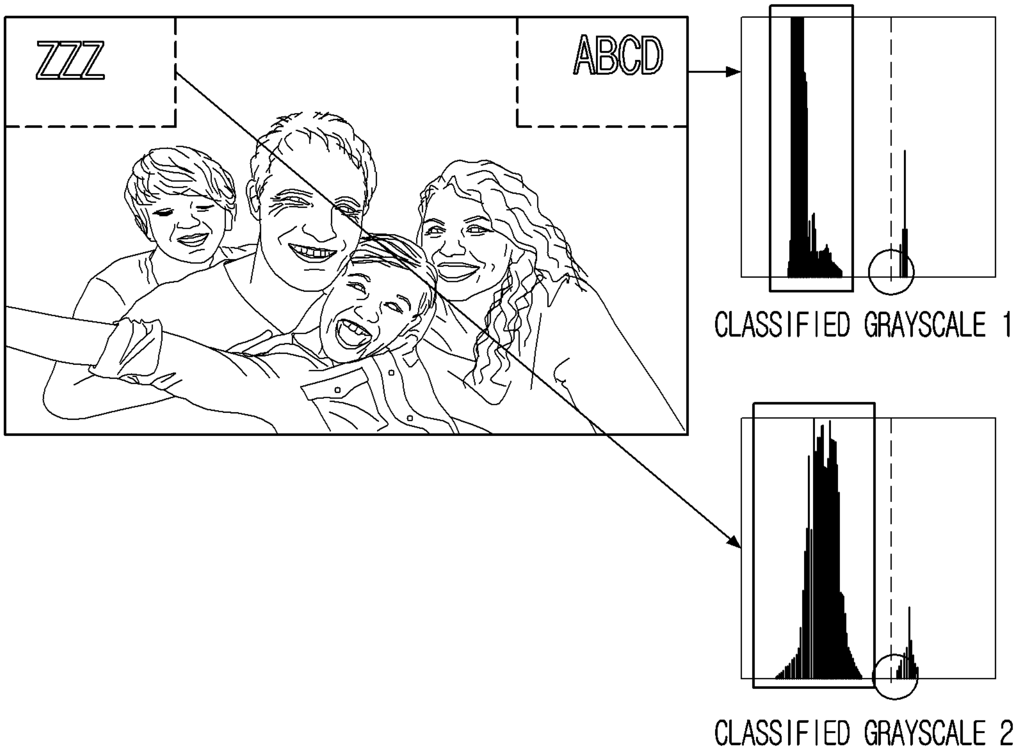

FIGS. 5 and 6 are diagrams illustrating a threshold grayscale value according to an embodiment of the disclosure.

The processor 120 may identify one area in an input image based on a pixel value included in an input image. For example, as illustrated in FIG. 5, the processor 120 may identify an area including the ABCD as one area. Here, the ABCD may be a logo area, and the rest of the one area may be a background area.

A size of an area may be a preset state. For example, the processor 120 may identify a frame included in an input image as a plurality of areas, compare pixel values corresponding to each of the plurality of areas in the peripheral frame, and identify one of the plurality of areas as one area. In this case, the size of one area may be the same as the size of one of the plurality of areas. Alternatively, the processor 120 may identify a logo area by inputting a frame included in an input image to an artificial intelligence model, and identify one area including the logo area. In this case, the processor 120 may identify one area centering on the logo area.

The processor 120 may identify a threshold grayscale value based on histogram information of one area, identify, as a first area 510, an area having a grayscale value equal to or greater than a threshold grayscale value in one area, and identify the remaining area as a second area 520. The processor 120 may identify a threshold grayscale value based on at least one of an average value of grayscale values of pixels included in the identified area, an average picture level (APL), and a binarization algorithm. In this case, when the first area 510 is continuously displayed for a long time with a relatively higher luminance than the second area 520, an afterimage may be more likely to occur than the second area 520.

The processor 120 may identify a plurality of areas in the input image based on a pixel value included in the input image. For example, as illustrated in FIG. 6, the processor 120 may identify a plurality of areas spaced apart from each other. One of the plurality of areas includes a logo area, such as ZZZ, and the other of the plurality of areas may include a logo area, such as ABCD.

The processor 120 may identify a threshold grayscale value for each of the plurality of areas based on histogram information of each of the plurality of areas, identify an area having a grayscale value equal to or greater than a threshold grayscale value corresponding to each of the plurality of areas as a first area, and identify the remaining area as a second area.

The processor 120 may identify an area including a log area through the above method, obtain a threshold grayscale value of an area, and divide the one area into a logo area and a background area.

Figure 7:
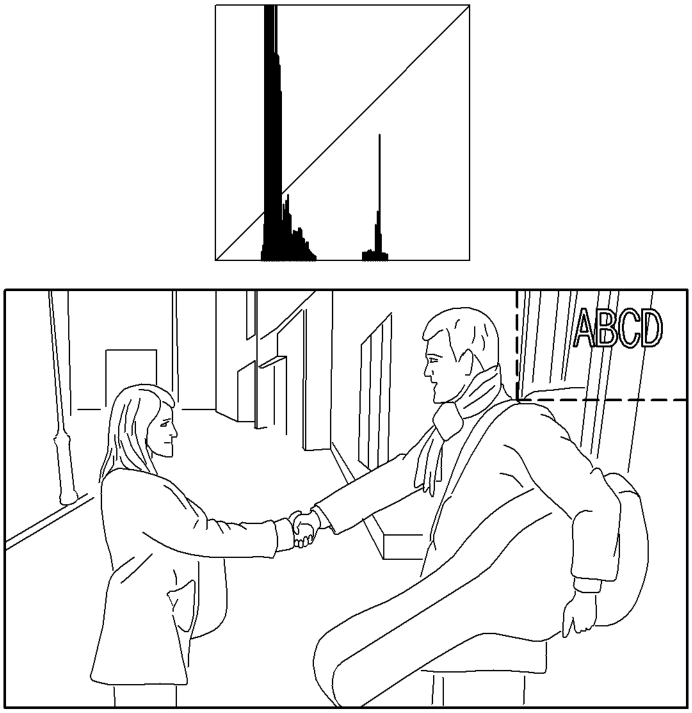
FIGS. 7 to 9 are diagrams illustrating a method for reducing luminance of a logo area and a background area according to an embodiment of the disclosure.
Figure 8:
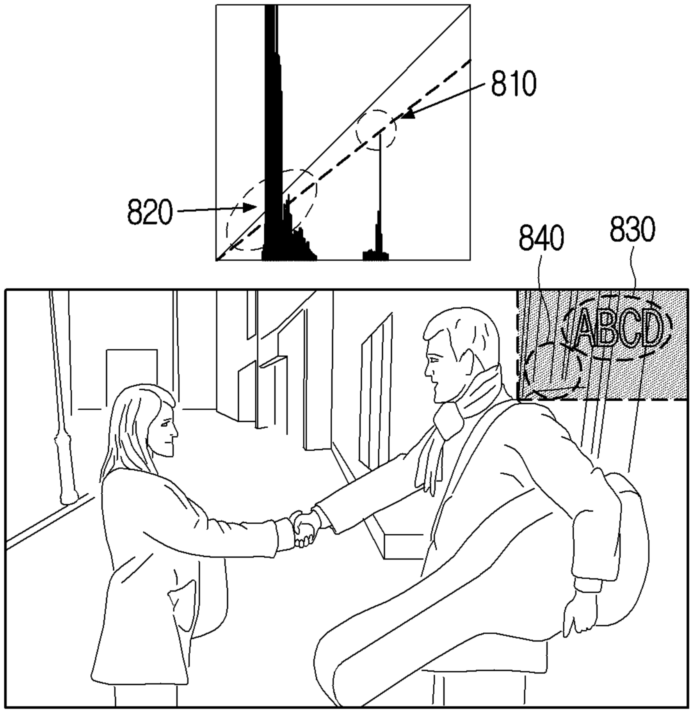
Figure 9:
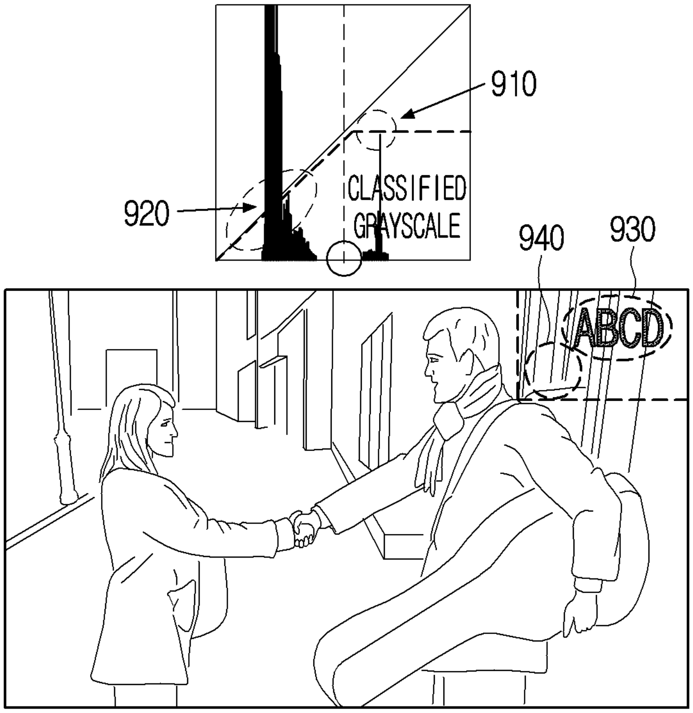

FIGS. 7 to 9 are diagrams illustrating a method for reducing luminance of a logo area and a background area according to an embodiment of the disclosure.

FIG. 7 shows an input image including a logo area such as ABCD and a histogram of one area of the input image. Here, one area may include a logo area and a background area. A diagonal line represented by a solid line in the histogram is an example of a luminance reduction curve, and according to the luminance reduction curve of FIG. 7, an input image may be output with a luminance corresponding to a grayscale value.

FIG. 8 shows an example in which the slope of the luminance reduction curve is lower and illustrates an operation in which a luminance reduction curve of the solid line diagonal line of FIG. 7 is changed to a luminance reduction curve of a dotted diagonal line. That is, according to the luminance reduction curve of FIG. 8, the input image may be output at a luminance lower than the luminance corresponding to the grayscale value.

The logo area 810 may have reduced luminance as 830 and the background area 820 may have reduced luminance as 840, and may have loss of luminance in the background area since the luminance is reduced in all grayscales without considering grayscales.

In FIG. 9, for example, the processor 120 may maintain the luminance of the logo area 910 at a preset luminance, and output luminance of the background area 920 as the luminance corresponding to the grayscale value. Accordingly, in the logo area, luminance is lowered like 930 to suppress generation of afterimage, and the background area is output with luminance corresponding to the grayscale value as in 940, thereby preventing deterioration of image quality.

FIG. 9 illustrates that luminance of the background area is not reduced, but this is merely exemplary and the luminance reduction curve of the background area may be in a format that the incline is lowered as FIG. 8.

Figure 10:
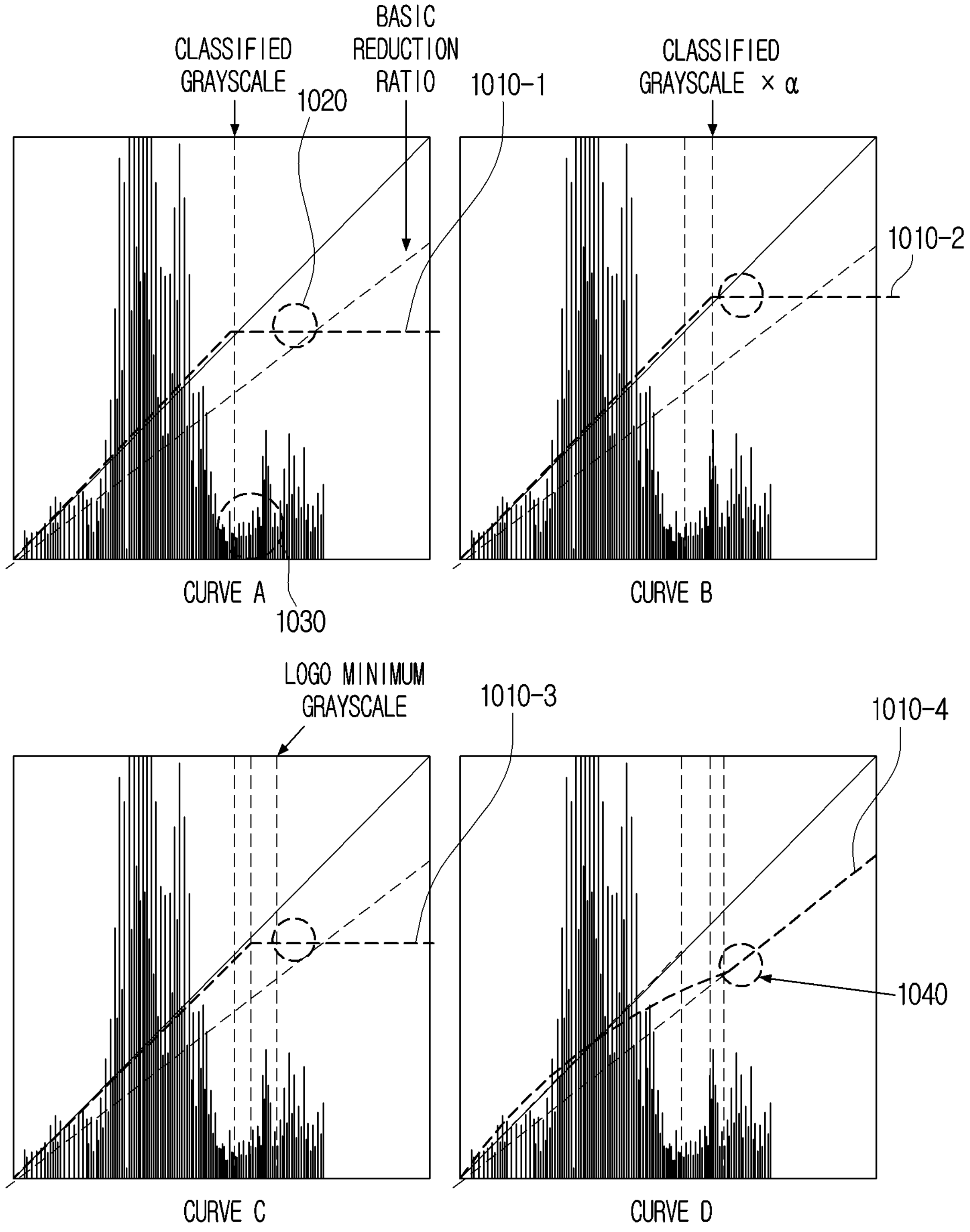
FIG. 10 is a diagram illustrating a luminance reduction curve according to an embodiment of the disclosure.

FIG. 10 is a diagram illustrating a luminance reduction curve according to an embodiment of the disclosure.

First, the processor 120 may reduce luminance of an area having a grayscale value greater than or equal to a threshold grayscale value (classified grayscale) based on a first luminance adjustment method for maintaining the luminance at a preset luminance such as curve A (1010-1), and may output an area having a grayscale value less than a threshold grayscale value and based on a second luminance adjustment method for outputting the luminance at a luminance corresponding to the grayscale value.

The luminance of the logo area may be reduced (1020), and luminance loss of some grayscales in a background area may occur (1030).

Alternatively, the processor 120 may update a threshold grayscale value by applying a preset weight (α) to a threshold grayscale value, such as curve B (1010-2), reduce the luminance of an area having a grayscale value equal to or greater than a threshold grayscale value updated based on a first luminance adjustment scheme in which the luminance is maintained at a preset luminance, and output an area having a grayscale value less than the updated threshold grayscale value based on a second luminance adjustment scheme for outputting a luminance corresponding to the grayscale value. Here, the preset weight may be 1 or more.

In this example, the luminance of the background area may be preserved, but if the preset weight is very small, the luminance of the background area is not large, and if the preset weight is very large, the effect of reducing the logo area may be lowered.

The processor 120 may identify a minimum grayscale value of a logo area, such as a curve C 1010-3, update a value between a threshold grayscale value and a minimum grayscale value of the logo area as a threshold grayscale value, reduce luminance of an area having a grayscale value equal to or greater than an updated threshold grayscale value based on a first luminance adjustment method of maintaining the luminance at a preset luminance, and output an area having a grayscale value less than the updated threshold grayscale value based on a second luminance adjustment method outputting a luminance corresponding to the grayscale value.

In this example, the effect of the reduction operation of the logo area may be lowered.

Alternatively, the processor 120 may identify the minimum grayscale value of the logo area, such as the curve D (1010-4), update the threshold grayscale value to the minimum grayscale value of the logo area, reduce the luminance of the area having a grayscale value equal to or greater than the updated threshold grayscale value based on a first luminance adjustment method that reduces the luminance at a predetermined ratio, and output an area having a grayscale value less than the updated threshold grayscale value based on a second luminance adjustment method for adjusting the luminance at a different ratio according to the grayscale value.

In this example, there may be luminance loss in a background area, but luminance of background may be preserved more than the basic reduction ratio.

The examples described in FIG. 10 are merely examples, and may be combined by other methods. For example, the processor 120 may adjust the luminance like the curve D 1010-4 without updating the threshold grayscale value to the minimum grayscale value of the logo area.

Figure 11:
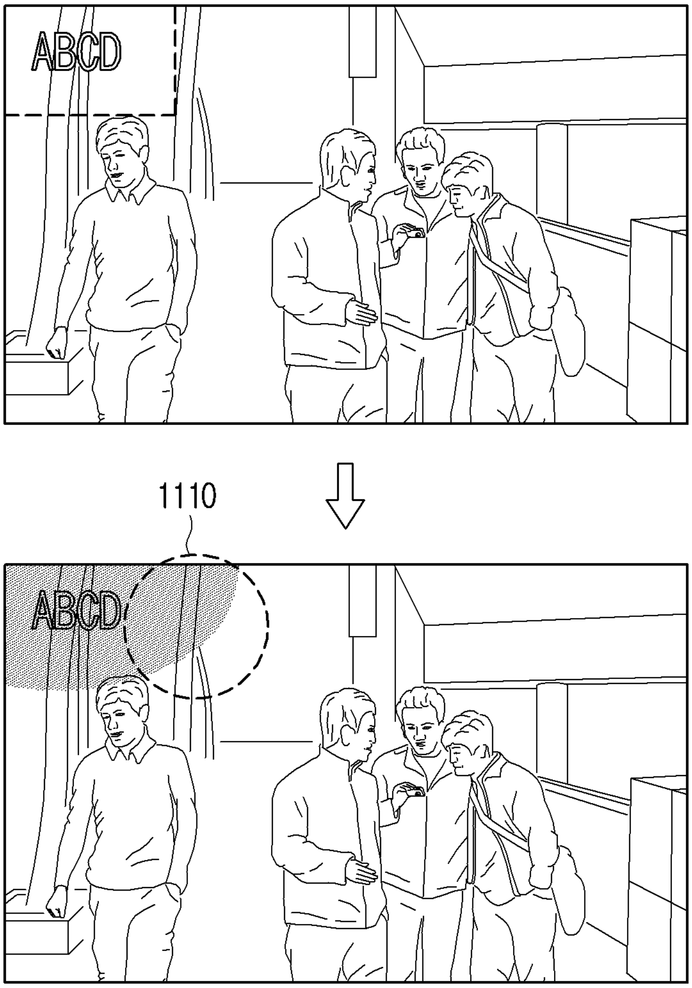
FIGS. 11 and 12 are diagrams illustrating a luminance reduction range according to an embodiment of the disclosure.
Figure 12:
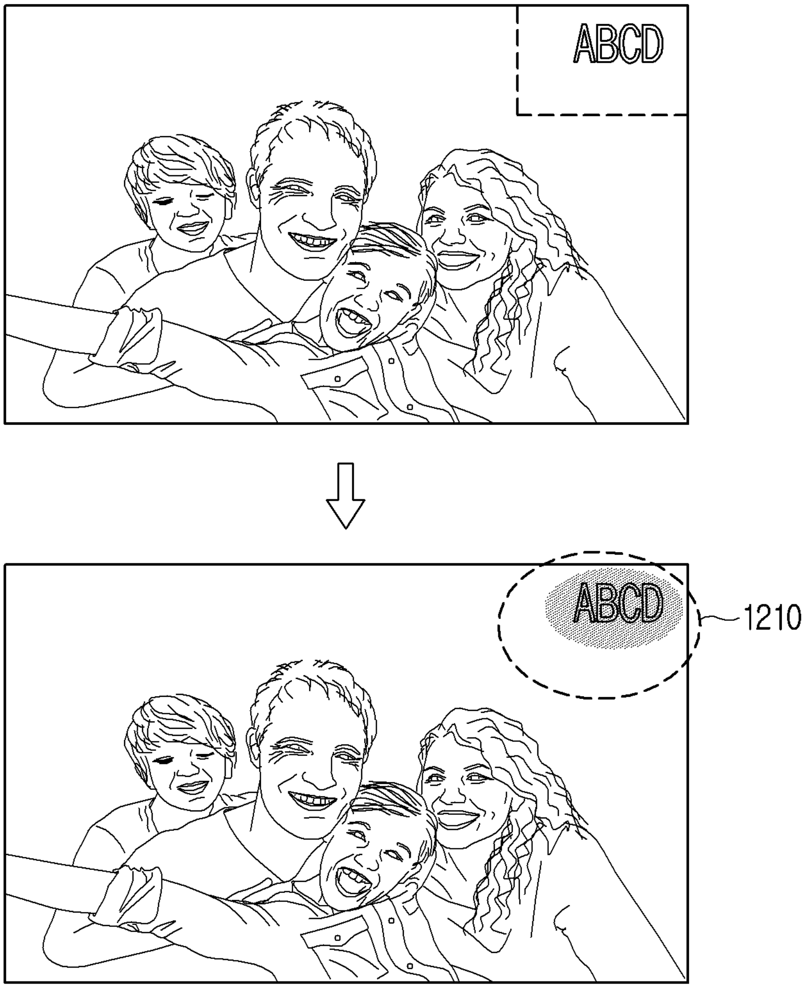

FIGS. 11 and 12 are diagrams illustrating a luminance reduction range according to an embodiment of the disclosure.

The image quality may be changed according to the level of the flatness of the input image. Here, the level of flatness of one area of the input image may be expressed as flat information, and the flat information indicates the number of pixels having a pixel value difference between adjacent pixels in one area thereof being less than a preset value. However, the embodiment is not limited thereto, and other methods that represent the level of flatness of an image may be used.

The upper portion of FIG. 11 shows an example in which the flat information is less than a threshold value in one area, and one area of the input image may be determined as a complex image. In this case, image quality degradation 1110 due to luminance loss may occur as shown in the lower end of FIG. 11.

The upper portion of FIG. 12 shows an example in which flat information is greater than or equal to a threshold value in one area, and one area of the input image may be determined as a flat image. In this case, a luminance reduction boundary 1210 may be identified as shown in the lower portion of FIG. 12.

The processor 120 may identify a range of luminance reduction based on the flat information taking the foregoing into consideration, which will be described below.

Figure 13:
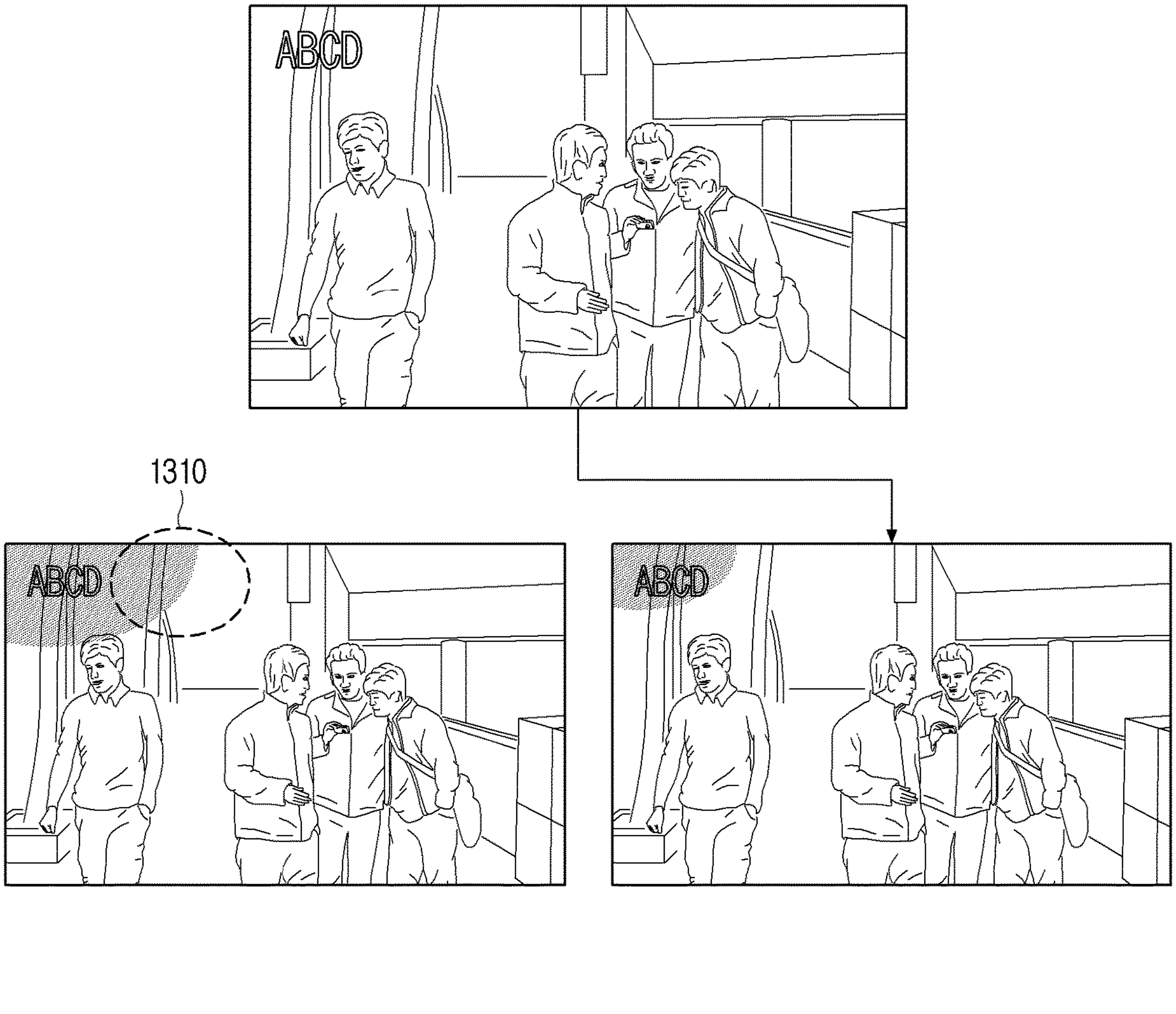
FIGS. 13 and 14 are diagrams illustrating a change in a luminance reduction range according to flat information according to an embodiment of the disclosure.
Figure 14:
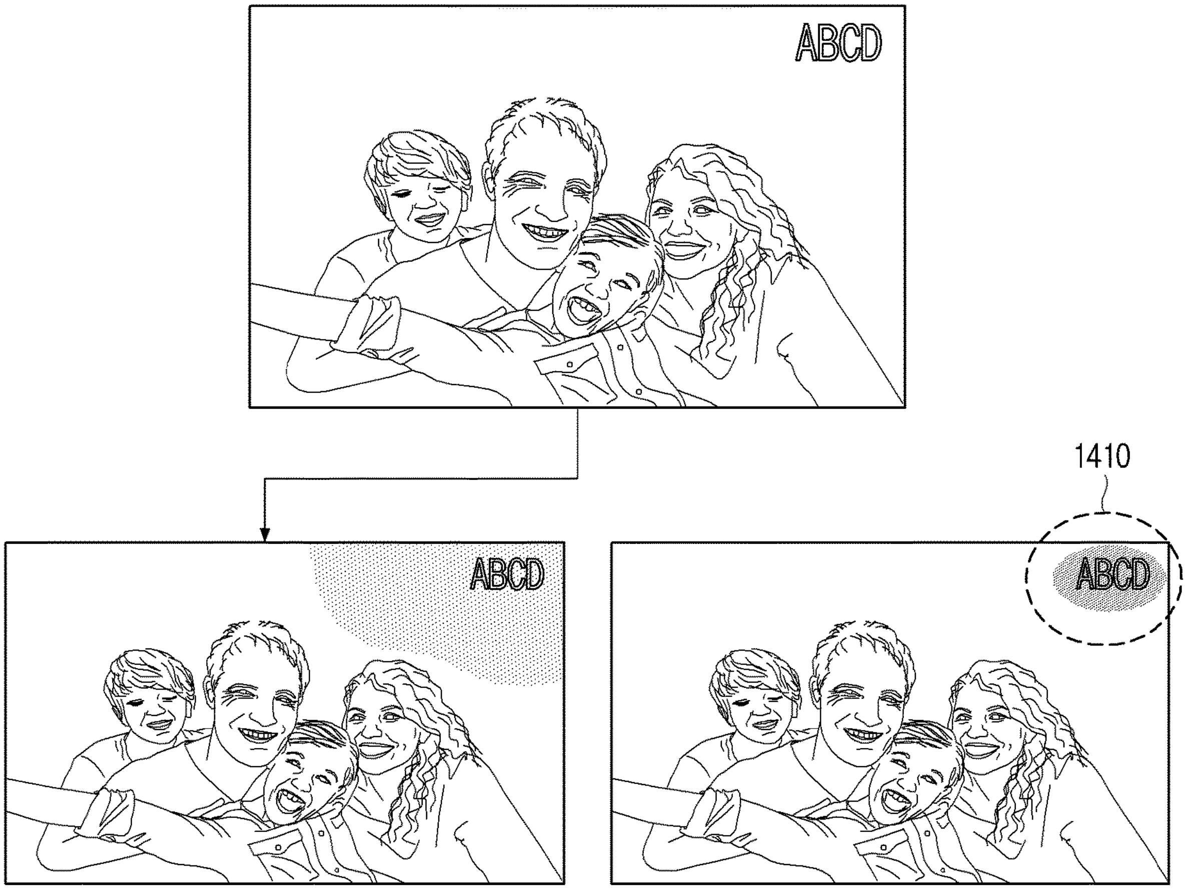

FIGS. 13 and 14 are diagrams illustrating a change in a luminance reduction range according to flat information according to an embodiment of the disclosure.

The processor 120 may acquire, as flat information, the number of pixels in which the difference between pixel values between adjacent pixels in the identified area is less than a preset value, and adjust the background area based on the flat information.

For example, as illustrated in FIG. 13, the processor 120 may reduce the background area when the flat information is less than a threshold value. Accordingly, image quality deterioration (1310) due to luminance loss may be minimized.

As shown in FIG. 14, if the flat information is equal to or greater than a threshold value, the background area may be enlarged. Accordingly, the problem in which the luminance reduction boundary 1410 is identified may be minimized.

However, the embodiment is not limited thereto, and the processor 120 may obtain, as flat information, the number of pixels in which a difference between pixel values between adjacent pixels in an identified area and an adjacent area of the identified area is less than a preset value.

Figure 15:
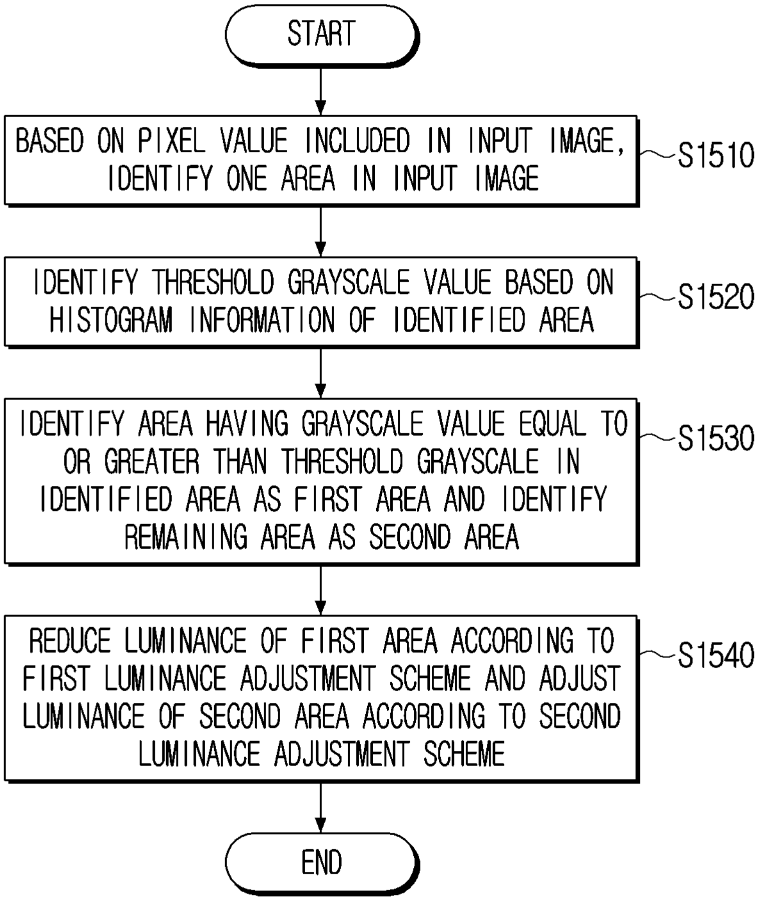
FIG. 15 is a flowchart illustrating a method for controlling a display apparatus according to an embodiment of the disclosure.

FIG. 15 is a flowchart illustrating a method for controlling a display apparatus according to an embodiment of the disclosure.

Based on a pixel value included in an input image, an area is identified in the input image in operation S1510. A threshold grayscale value is identified based on histogram information of the identified area in operation S1520. An area having a grayscale value equal to or greater than the threshold grayscale in the identified area is identified as a first area and a remaining area is identified as a second area in operation S1530. Luminance of the first area is reduced according to a first luminance adjustment scheme and luminance of a second area is reduced according to a second luminance adjustment scheme in operation S1540.

The adjusting in operation S1540 may include reducing luminance of the first area based on the first luminance adjustment scheme for reducing the luminance at a predetermined ratio; and adjusting luminance of the second area based on the second luminance adjustment scheme for adjusting the luminance at a different ratio according to the grayscale value.

The adjusting in operation S1540 may include reducing luminance of the first area based on the first luminance adjustment scheme to maintain luminance to a preset luminance, and outputting the second area based on the second luminance adjustment scheme to output luminance corresponding to a grayscale value.

The method may further include updating the threshold grayscale value by applying a preset weight to the threshold grayscale value, and the identifying as the second area in operation S1530 may include identifying, in the identified area, an area having a grayscale value equal to or greater than the updated threshold grayscale value as the first area and identifying a remaining area as the second area, wherein the preset weight is greater than or equal to 1.

The method may further include identifying a logo area in the first area, updating the threshold grayscale value based on the threshold grayscale value and a minimum grayscale value in the logo area, and the identifying as the second area in operation S1530 may include identifying an area having a grayscale value greater than or equal to the updated threshold grayscale value in the identified area as the first area and identify a remaining area as the second area.

The identifying a threshold grayscale value in operation S1520 may include identifying the threshold grayscale value based on at least one of an average value of grayscale values of pixels included in the identified area, average picture level (APL), and binarization algorithm.

The method may further include obtaining a number of pixels in which a difference of a pixel value between adjacent pixels in the identified area is less than a preset value as flat information, and adjusting the second area based on the flat information.

The obtaining as the flat information may include obtaining a number of pixels in which a difference of a pixel value between adjacent pixels in the identified area and a neighboring area of the identified area is less than the preset value as the flat information.

The operation of adjusting the second area may enlarge the second area when the flat information is greater than or equal to a threshold value and reduce the second area when the flat information is less than a threshold value.

The operation of identifying one area in operation S1510 may identify one area by comparing a pixel value corresponding to at least some of a plurality of frames included in the input image.

Here, the operation of identifying one area in operation S1510 may identify each of the plurality of frames as a plurality of areas, compare pixel values corresponding to each of the plurality of areas in at least some of the plurality of frames, and identify one of the plurality of areas as one area.

According to various embodiments of the disclosure, the display apparatus may suppress the generation of afterimage while reducing image quality degradation by adjusting the luminance of an area in which an afterimage is likely to occur and the luminance of the remaining area by a different luminance adjustment method.

Also, the display apparatus may solve a problem in which the luminance reduction boundary is visible as the range of the area for adjusting the luminance is determined based on the difference between the pixel values between adjacent pixels.

Meanwhile, various embodiments of the disclosure may be implemented in software, including instructions stored on machine-readable storage media readable by a machine (e.g., a computer). An apparatus may call instructions from the storage medium, and execute the called instruction, including an electronic apparatus (for example, electronic apparatus A) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™ and App Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. Each of the software modules may perform one or more of the functions and operations described herein.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device. The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. A display apparatus comprising:

a display; and at least one processor configured to:

based on pixel values included in an input image, identify an area in the input image that is less than an entire area of the input image and includes a logo area and background area around the logo area, identify a threshold grayscale value based on histogram information of the identified area, identify an area having a grayscale value equal to or greater than the threshold grayscale value in the identified area in the input image as a first area that includes the logo area and identify a remaining area in the identified area in the input image as a second area that includes the background area, and control the display to reduce luminance of the first area according to a first luminance adjustment scheme to reduce generation of an afterimage of the logo area, and adjust luminance of a second area according to a second luminance adjustment scheme to reduce deterioration of image quality due to the reduction of luminance of the first area.

2. The display apparatus of claim 1, wherein the first luminance adjustment scheme reduces luminance at a predetermined ratio, and the second luminance adjustment scheme adjusts luminance at a different ratio according to grayscale value.

3. The display apparatus of claim 1, wherein:

the first luminance adjustment scheme maintains luminance to a preset luminance, and the second luminance adjustment scheme outputs luminance corresponding to a grayscale value.

4. The display apparatus of claim 1, wherein the at least one processor is further configured to;

update the threshold grayscale value by applying a preset weight to the threshold grayscale value, identify, in the identified area in the input image, an area having a grayscale value equal to or greater than the updated threshold grayscale value as the first area and identify a remaining area in the identified area in the input image as the second area, wherein the preset weight is greater than or equal to 1.

5. The display apparatus of claim 1, wherein the at least one processor is further configured to:

update the threshold grayscale value based on the threshold grayscale value and a minimum grayscale value in the logo area, and identify an area having a grayscale value greater than or equal to the updated threshold grayscale value in the identified area in the input image as the first area and identify a remaining area in the identified area in the input image as the second area.

6. The display apparatus of claim 1, wherein the at least one processor is further configured to:

identify the threshold grayscale value based on at least one of an average value of grayscale values of pixels included in the identified area in the input image, average picture level (APL), and binarization algorithm.

7. The display apparatus of claim 1, wherein the at least one processor is further configured to:

obtain a number of pixels in which a difference of a pixel value between adjacent pixels in the identified area in the input image is less than a preset value as flat information, and adjust a size of the second area based on the flat information.

8. The display apparatus of claim 7, wherein the at least one processor is further configured to:

obtain a number of pixels in which a difference of a pixel value between adjacent pixels in the identified area in the input image and a neighboring area of the identified area in the input image is less than the preset value as the flat information.

9. The display apparatus of claim 7, wherein the at least one processor is further configured to:

enlarge the second area based on the flat information being greater than or equal to a threshold value, and reduce the second area based on the flat information being less than the threshold value.

10. The display apparatus of claim 1, wherein the at least one processor is further configured to:

identify the area in the input image by comparing corresponding pixel values in at least two frames among a plurality of frames included in the input image.

11. The display apparatus of claim 10, wherein the at least one processor is further configured to:

identify each of the plurality of frames as a plurality of areas, and identify one of the plurality of areas as the area in the input image by comparing pixel values corresponding to each of the plurality of areas in at least some of the plurality of frames.

12. A method comprising:

based on pixel values included in an input image, identifying an area in the input image that is less than an entire area of the input image and includes a logo area and a background area around the logo area;

identifying a threshold grayscale value based on histogram information of the identified area;

identifying an area having a grayscale value equal to or greater than the threshold grayscale value in the identified area in the input image as a first area that includes the logo area and identify a remaining area in the identified area in the input image as a second area that includes the background area; and reducing luminance of the first area according to a first luminance adjustment scheme to reduce generation of an afterimage of the logo area and adjusting luminance of a second area according to a second luminance adjustment scheme to reduce deterioration of image quality due to the reduction of luminance of the first area.

13. The method of claim 12, wherein:

the first luminance adjustment scheme reduces luminance at a predetermined ratio; and the second luminance adjustment scheme adjusts luminance at a different ratio according to grayscale value.

14. The method of claim 12, wherein:

the first luminance adjustment scheme maintains luminance to a preset luminance; and the second luminance adjustment scheme outputs luminance corresponding to a grayscale value.

15. The method of claim 12, further comprising:

updating the threshold grayscale value by applying a preset weight to the threshold grayscale value, wherein the identifying an area comprises identifying, in the identified area in the input image, an area having a grayscale value equal to or greater than the updated threshold grayscale value as the first area, and the identifying a remaining area comprises identifying a remaining area in the identified area in the input image as the second area, wherein the preset weight is greater than or equal to 1.

16. The method of claim 12, further comprising:

updating the threshold grayscale value based on the threshold grayscale value and a minimum grayscale value in the logo area, and wherein the identifying an area comprises identifying an area having a grayscale value greater than or equal to the updated threshold grayscale value in the identified area in the input image as the first area, and the identifying a remaining area comprises identifying a remaining area in the identified area in the input image as the second area.

17. The method of claim 12, wherein the identifying the threshold grayscale value comprises identifying the threshold grayscale value based on at least one of an average value of grayscale values of pixels included in the identified area in the input image, average picture level (APL), and binarization algorithm.

18. The method of claim 12, further comprising:

obtaining a number of pixels in which a difference of a pixel value between adjacent pixels in the identified area in the input image is less than a preset value as flat information, and adjusting a size of the second area based on the flat information.

19. The method of claim 18, wherein the obtaining comprises obtaining a number of pixels in which a difference of a pixel value between adjacent pixels in the identified area in the input image and a neighboring area of the identified area in the input image is less than the preset value as the flat information.

20. The method of claim 18, wherein the adjusting the second area comprises enlarging the second area based on the flat information being greater than or equal to a threshold value, and reducing the second area based on the flat information being less than the threshold value.

* * * * *